United States Patent [19]

Mizutani et al.

[11] Patent Number: 5,034,948
[45] Date of Patent: Jul. 23, 1991

[54] TELEPHONE APPARATUS SYSTEM

[75] Inventors: Koichi Mizutani; Isamu Ozawa, both of Tokyo, Japan

[73] Assignee: Canon Kabushiki Kaisha, Tokyo, Japan

[21] Appl. No.: 397,175

[22] Filed: Aug. 22, 1989

[30] Foreign Application Priority Data

Aug. 26, 1988 [JP] Japan .................. 63-210656

[51] Int. Cl.⁵ .......................................... H04M 11/00
[52] U.S. Cl. ................................... 370/79; 370/110.1; 379/93; 379/94
[58] Field of Search ............... 370/110.1, 79, 80, 85.1, 370/85.2, 85.6; 379/93, 94, 95, 96

[56] References Cited

U.S. PATENT DOCUMENTS

| 4,746,986 | 5/1988 | Tanigawa | 379/93 |
| 4,794,595 | 12/1988 | Ohyama | 370/110.1 |
| 4,893,331 | 1/1990 | Horiuchi et al. | 379/93 |

FOREIGN PATENT DOCUMENTS 0274860 11/1987 Japan ............................. 379/94

Primary Examiner—Douglas W. Olms
Assistant Examiner—Alpus H. Hsu
Attorney, Agent, or Firm—Fitzpatrick, Cella, Harper & Scinto

[57] ABSTRACT

A telephone system connected to an ISDN and a public service telephone network (PSTN) includes ISDN and PSTN interfaces and allows connected telephone sets to communicate with the both the ISDN and PSTN through a telephone apparatus main body. When the telephone apparatus main body becomes inoperative due to a power failure or the like, the ISDN or the PSTN is directly connected to one of the telephone sets. The connected telephone set receives operating power from the directly connected ISDN or PSTN, and can serve as a telephone set exclusively for the connected ISDN or PSTN.

6 Claims, 5 Drawing Sheets

TELEPHONE APPARATUS SYSTEM

BACKGROUND OF THE INVENTION

1. Field of the Invention

The present invention relates to a telephone apparatus system, connected to an ISDN (Integrated Service Digital Network) and a public service telephone network, for performing verbal communication control at least between a connected line and accommodated extensions.

2. Description of the Prior Art

As shown in FIG. 5, in a conventional key telephone apparatus, a main apparatus 60 accommodates a plurality of office lines (52 and 53) connected to a public service telephone network (analog telephone network; PSTN) 51, and performs speech path control between a connected line and extension telephone sets (54 to 56) connected to the main apparatus 60 or between extension telephone sets.

For this reason, the accommodated office lines are connected to only the PSTN 51. In this case, users cannot enjoy a variety of high-level services of an ISDN.

Power supply to the extension telephone sets (54 to 56) connected to the accommodated office lines is normally performed by the main apparatus 60. For this reason, the operation of the main apparatus 60 is stopped upon a power failure, and the functions such as an exchange processing function of the entire system are stopped as well as power supply to the extension telephone sets (54 to 56).

In order to allow services of an ISDN, as shown in FIG. 6, a main apparatus 70 accommodates a plurality of office lines (62 and 63) connected to an ISDN 61, and performs speech path control between a connected office line and extension telephone sets (64 to 66) connected to the main apparatus 70 or between the extension telephone sets.

In this case, however, the functions of the main apparatus 70 and power supply to the extension telephone sets 64 to 66 are stopped upon a power failure, and hence, the functions of the entire system are stopped.

SUMMARY OF THE INVENTION

The present invention has been made to solve the above problems and has as its object to provide a telephone apparatus system capable of enjoying services of both the ISDN and the public service telephone network (PSTN).

It is another object of the present invention to provide a telephone apparatus system which can perform verbal communications even when the operation of a telephone apparatus main body of the system is disabled due to a power failure or the like.

It is still another object of the present invention to provide a telephone apparatus system in which connected telephone sets can be operated as ISDN correspondence devices by power supply from the ISDN even when the operation of a telephone apparatus main body of the system is disabled due to a power failure or the like.

In order to achieve the above objects, the telephone apparatus system of the present invention comprises the following means.

That is, a telephone apparatus main body comprises ISDN connection means for accommodating a line connected to an ISDN, telephone line connection means for accommodating a line connected to a public service telephone network (PSTN), extension accommodation means for accommodating an extension connected to an extension telephone set, and verbal communication control means for performing speech path control between accommodated lines, and the extension telephone set comprises verbal communication means capable of performing verbal communication control in an ISDN verbal communication mode and verbal communication control in a verbal communication mode of the PSTN.

Thus, a subscriber can enjoy services of the ISDN even in a power failure state.

It is still another object of the present invention to provide a telephone apparatus system which directly connects an extension telephone set to the PSTN upon detection of an inoperative state when a telephone apparatus main body comprises an ISDN interface.

When the telephone apparatus main body cannot be operated by only power supplied from the ISDN, verbal communications can be performed by power supplied from the PSTN.

It is still another object of the present invention to provide a telephone apparatus system which detects an inoperative state of a telephone apparatus, and automatically directly connects an extension telephone set to the ISDN or PSTN.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the present invention will be described in detail below with reference to the accompanying drawings.

First Embodiment

Figure 1:
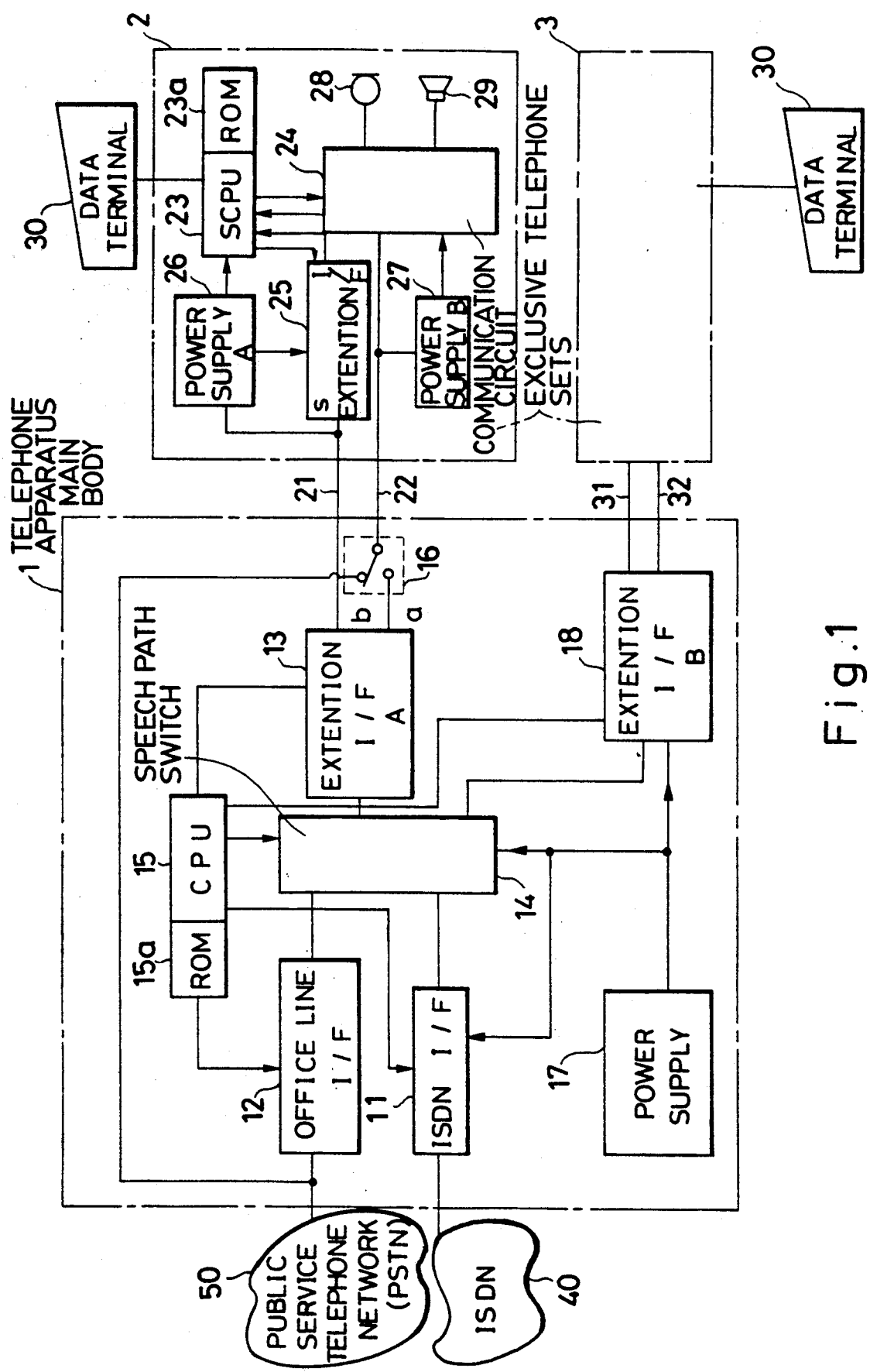
FIG. 1 is a block diagram showing an arrangement of a system according to a first embodiment of the present invention.

FIG. 1 is a block diagram showing an arrangement of a system according to a first embodiment of the present invention. In FIG. 1, reference numeral 1 denotes a main apparatus as a telephone apparatus main body accommodating lines connected to an ISDN 40 and an analog public service telephone network (to be referred to as a "PSTN" hereinafter) 50; 2, an exclusive telephone set which is controlled by the main apparatus 1 and can be directly connected to the ISDN 40; and 3, an exclusive telephone controlled by the main apparatus 1.

The main apparatus 1 has the following arrangement. That is, in the main apparatus 1, reference numeral 11 denotes an ISDN interface (ISDN I/F) for interfacing with the ISDN 40; 12, an office line interface (office line I/F) for interfacing with the PSTN; 13, an extension interface (extension I/F) A for interfacing with the exclusive telephone set 2; 14, a speech path switch for performing speech path control between connected telephone sets and between the connected telephone sets and the accommodated lines, and sending various tones; 15, a CPU for controlling the entire main apparatus (e.g., detecting a power failure, performing power failure processing, and the like) in accordance with a program stored in an internal ROM 15a; 16, a switch for, when a power failure occurs, directly connecting the lines connected to the PSTN to the exclusive telephone set 2 while detouring the internal circuit of the main apparatus 1 under the control of the CPU 15; 17, a power supply, obtaining an electric power from a commercial power supply line, for supplying a drive power to respective components in the main apparatus 1 and to the exclusive telephone sets 2 and 3 through the extension I/Fs 13 and 18. Reference numeral 18 denotes an extension interface (extension I/F) B for interfacing with the exclusive telephone set 3; 21 and 31, data transmission lines of extensions; and 22 and 32, speech transmission lines of the extensions.

The exclusive telephone sets 2 and 3 have the following arrangements. Note that these telephone sets have the same arrangement, and the arrangement of the telephone set 3 is omitted.

In each of the exclusive telephone sets 2 and 3, reference numeral 23 denotes a slave CPU (SCPU) for controlling the entire telephone set in accordance with a program stored in an internal ROM 23a; 24, a communication circuit for performing analog-to-digital (A/D) conversion and digital-to-analog (D/A) conversion of a speech signal; 25, a slave extension interface (S-extension I/F) for interfacing with the extension I/F A 13 of the main apparatus 1; 26, a slave power supply A for receiving power from the main apparatus 1 through the data transmission line 21; and 27, a slave power supply B for receiving power through the speech transmission line 22. Reference numeral 28 denotes a transmitter (microphone); and 29, a receiver (speaker).

In a normal operation state, the switch 16 is connected to a contact "a" side under the control of the CPU 15. The power supply 17 receives an electric power through a commercial power supply line, and supplies an operation power to the respective components of the main apparatus 1. The power supply 17 also supplies a power to the exclusive telephone sets 2 and 3 through the extension I/Fs 13 and 18, the transmission lines 21 and 22, and the transmission lines 31 and 32.

The operation of this embodiment with the above arrangement in a normal state (not in a power failure state) will be described below.

In the normal state, the switch 16 is connected to the contact "a" side, and the extension I/F A 13 is connected to the communication circuit 24 and the power supply B 27 of the exclusive telephone set 2. The ISDN 40 is connected to the ISDN I/F 11. A speech-data integral signal from the ISDN 40 is supplied to the S-extension I/Fs 25 of the exclusive telephone sets 2 and 3 via the ISDN I/F 11, the speech path switch 14, the extension I/Fs 13 and 18, and the data transmission lines 21 and 31.

Each SCPU 23 receives the speech-data integral signal from the S-extension I/F 25. The SCPU 23 disassembles the received signal into a speech signal and a data signal.

The disassembled speech signal is D/A-converted to an analog signal by the communication circuit 24, and is then output from the speaker 29. On the other hand, the data signal is sent to a data terminal 30 as a digital signal.

The communication circuit 24 A/D-converts the analog speech signal input from the microphone 28, and outputs it as a digital speech signal to the SCPU 23. The SCPU 23 assembles the digital speech signal and a digital data signal input from the data terminal 30 in the form of a speech-data integral signal, and sends it to the main apparatus 1 through the S-extension I/F 25.

Upon reception of the integral signal, the main apparatus 1 sends the received signal to the ISDN I/F 11 through the extension I/Fs 13 and 18 and the speech path switch 14. The integral signal is then sent from the ISDN I/F 11 to the ISDN 40, thus performing a verbal communication with a desired communication destination apparatus.

Lines from the PSTN 50 are accommodated in the office line I/F 12. An input analog speech signal from the PSTN 50 is sent to the communication circuits 24 of the exclusive telephone sets 2 and 3 via the speech path switch 14, the extension I/Fs 13 and 18, and the speech transmission lines 22 and 32. The input speech data is output from the speaker 29.

An input analog speech signal from the microphone 28 is sent to the extension I/Fs 13 and 18 of the main apparatus 1 through the communication circuit 24. The speech signal is then sent to the PSTN 50 through the speech path switch 14 and the office line I/F 12, and is sent to a desired destination.

When a calling request to the PSTN 50 is issued from the exclusive telephone set, a message indicating this is transmitted to the extension I/F 13 or 18 through the corresponding communication circuit 24, and the extension I/F 13 or 18 detects this message and informs it to the CPU 15. Upon reception of this message, the CPU 15 energizes the office line I/F 12, and performs calling processing for a desired exclusive telephone set or calling processing to the PSTN 50 in accordance with a telephone number signal sent from the exclusive telephone set. When a called party responds, a speech path is formed between a caller and called party, thus allowing verbal communication.

When an incoming call signal is input from the PSTN 50, the office line I/F 12 detects this signal, and informs it to the CPU 15. The CPU 15 causes the extension I/F 13 or 18 to call the exclusive telephone set to be connected. The CPU 15 controls the speech path switch 14 to form a speech path between the responding telephone set and the called PSTN line, and performs verbal communication processing.

As described above, exchange control among the PSTN 50, the ISDN 40, and the exclusive telephone sets is performed through the speech path switch 14.

In the above description, the communication circuit 24 controls A/D conversion of an analog speech signal input from the microphone 28 into a digital signal. However, the communication circuit may also have a function of assembling the converted digital speech signal and a data signal from the data terminal 30 in the form of a speech-data integral signal, and sending it to the main apparatus 1.

The exclusive telephone sets 2 and 3 receive power through the data and speech transmission lines 21 and 22. In the ISDN mode, the SCPU 23 and the like are controlled by power from the power supply A 26. In the PSTN mode, control associated with the communication circuit 24 of the speech transmission line 22 is performed by a power from the power supply B 27.

Control when the commercial power supply for supplying power to the main apparatus 1 cannot be supplied due to a power failure in the normal processing state described above and the main apparatus 1 is rendered inoperative will be described below.

When a power failure occurs, an output voltage of the power supply 17 is decreased. For this reason, when the CPU 15 detects a decrease in output voltage of the power supply 17, it switches the switch 16 to a contact "b" side, i.e., to a side where the line from the PSTN 50 detours the internal circuit of the main apparatus 1. Thus, the speech transmission line 22 is directly connected to the line connected to the PSTN 50.

The reason for connection with the PSTN 50 upon a power failure will be described below.

In general, power supplied from the ISDN is lower than that from the PSTN, and one or two telephone sets can only be operated by the power from the ISDN.

Therefore, as shown in FIG. 1, when the telephone set 2 has no ISDN I/F, an incoming call from the ISDN 40 must be supplied through the ISDN I/F in the main apparatus 1, and the main apparatus 1 cannot be operated by only power from the ISDN 40.

For this reason, in this embodiment, the telephone set 2 is directly connected to the PSTN 50 in the power failure state.

The exclusive telephone set 2 is directly connected to the PSTN 50 regardless of a halt of the main apparatus 1, and the power supply B 27 can obtain a power from an office side apparatus of the PSTN 50. An operation power of only the exclusive telephone set is very low, and the telephone set 2 can be satisfactorily operated by power supplied from the office side apparatus. Therefore, the exclusive telephone 2 can successively operate the communication circuit 24. Even when the main apparatus 1 is in the power failure state, a subscriber can enjoy a telephone service through the PSTN 50.

As described above, the telephone apparatus system according to this embodiment can operate as a PSTN connected telephone apparatus through the office line I/F 12 for the normal PSTN 50, and can operate as an ISDN correspondence apparatus through the ISDN I/F 11 for the ISDN 40.

When a power failure occurs, the system of this embodiment directly connects the exclusive telephone 2 to the PSTN 50 to be operated as a normal telephone set.

Second Embodiment

In the above description, the CPU 15 of the main apparatus 1 detects a decrease in output voltage of the power supply 17, and controls the switch 16 to be switched to the contact "b" side. However, the present invention is not limited to this. For example, the switch 16 may comprise a normally "b" connected type relay which is automatically switched to a contact "b" side upon power-off, so that the switch 16 can be automatically switched to the contact "b" side without control of the CPU 15 when the power supply of the main apparatus 1 is turned off.

Figure 2:
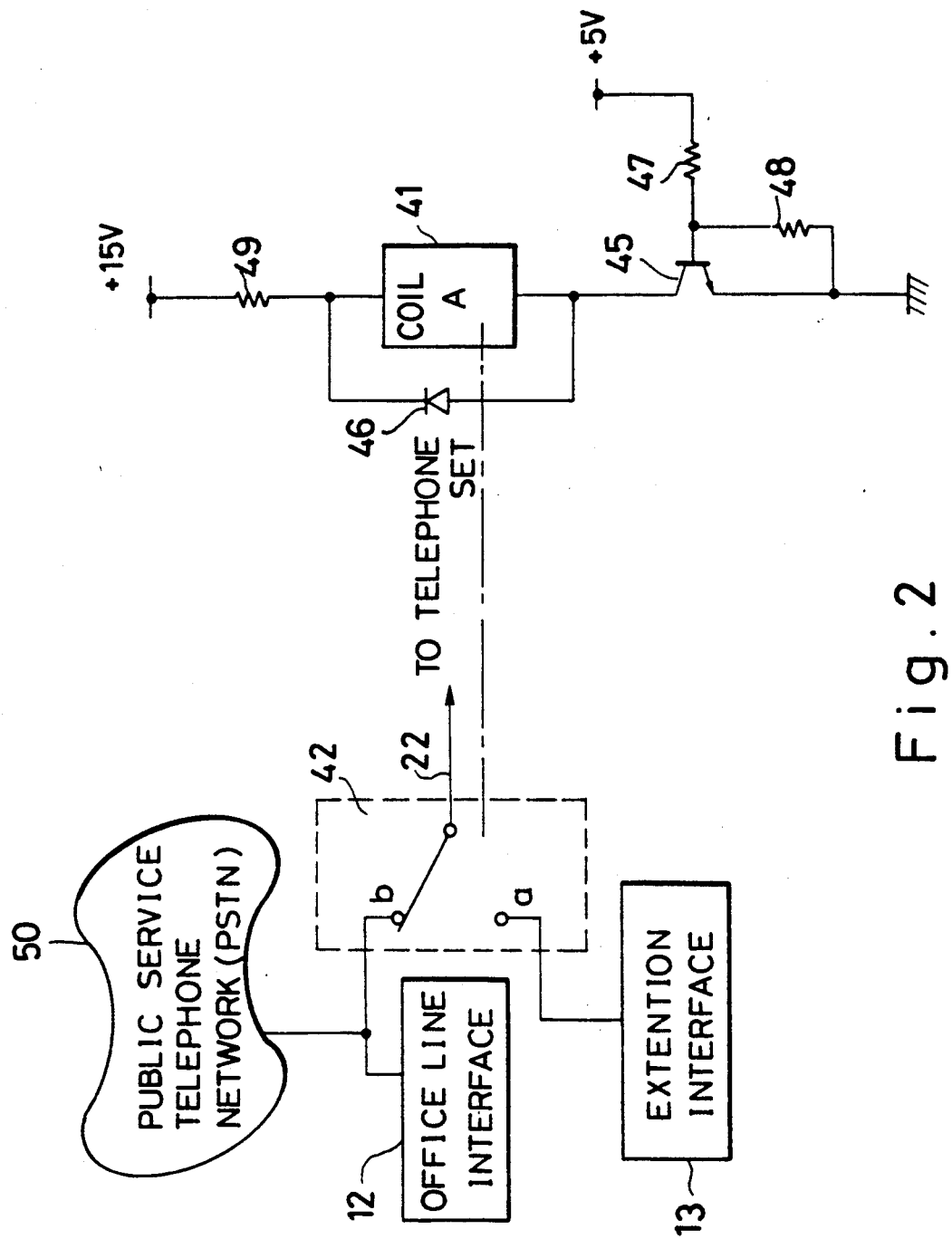
FIG. 2 is a circuit diagram showing in detail a switching function upon a power failure according to a second embodiment of the present invention.

FIG. 2 is a circuit diagram of an associated portion different from the arrangement of FIG. 1 when the switch 16 is replaced with such a relay.

In FIG. 2, reference numeral 41 denotes a coil portion of a relay A; and 42, a contact portion of the relay A. These portions respectively correspond to the common contact and contacts "a" and "b" of the switch 16. Reference numeral 45 denotes a transistor for controlling the relay A; 46, a diode; and 47 to 49, resistors.

In a normal state (not in a power failure state), i.e., when a power is supplied from a commercial power supply line to the power supply 17 and a power supply voltage of "+5 V" is supplied to the circuit shown in FIG. 2, the base of the transistor 45 is at high level, and the transistor 45 is kept "ON". Therefore, the coil portion 41 of the relay A is energized, and the contact portion 42 of the relay A is held at the contact "a" side. Thus, the telephone set and the speech transmission line 22 are connected to the extension I/F 13 of the main apparatus 1.

When the connected commercial power supply line stops power to the power supply 17 due to a power failure or the like, the power supply voltage of "+5 V" is no longer output. As a result, the base potential of the transistor 45 becomes the same "0 V" as the emitter potential, and the transistor 45 is turned off. For this reason, no current flows through the coil portion 41 of the relay A, and the contact portion 41 of the relay A is connected to the contact "b" side as a normal state. Therefore, the telephone set and the speech transmission line 22 are directly connected to the PSTN 50. As a result, the power supply B 27 can obtain a power from an office side apparatus, and can successfully operate the communication circuit 24. Thus, a subscriber can enjoy a telephone service through the PSTN 50.

With the above-mentioned control, even in a power failure state of the main apparatus 1, the telephone set 2 can receive a telephone service through the PSTN 50. In a normal state, a subscriber can enjoy a variety of high-level services through the ISDN in addition to a telephone service through the PSTN 50.

According to the first and second embodiments described above, a telephone apparatus system comprises the ISDN I/F and the PSTN I/F, the exclusive telephone sets 2 and 3 which can be operated while being connected to the ISDN and the PSTN, and means for automatically directly connecting the exclusive telephone set 2 to the PSTN in a power failure state of the main apparatus 1. Thus, the following effects can be obtained.

(1) When a power failure occurs and the main apparatus 1 stops its operation, various telephone services through the PSTN can be obtained using the exclusive telephone set 2.

(2) In this case, no special operation, e.g., changing connections in the normal operation state and in the power failure state, is required.

(3) No switching operation is required.

As described above, according to the present invention, the ISDN and the PSTN are simultaneously connected, so that a subscriber can enjoy a variety of high-level services through the ISDN and a normal telephone service using the PSTN.

When the main apparatus is inoperative, the extension telephone set is directly connected to the PSTN, so that a subscriber can enjoy a telephone service using the extension telephone set connected to the PSTN.

Third Embodiment

In the first embodiment, since the telephone set 2 does not have the ISDN I/F, it cannot be directly connected to the ISDN 40.

In a third embodiment described below, an extension telephone set comprises an ISDN I/F, so that the telephone set can be directly connected to the ISDN when a main apparatus is inoperative. Even when the main apparatus is inoperative, services of the ISDN can be obtained.

Figure 3:
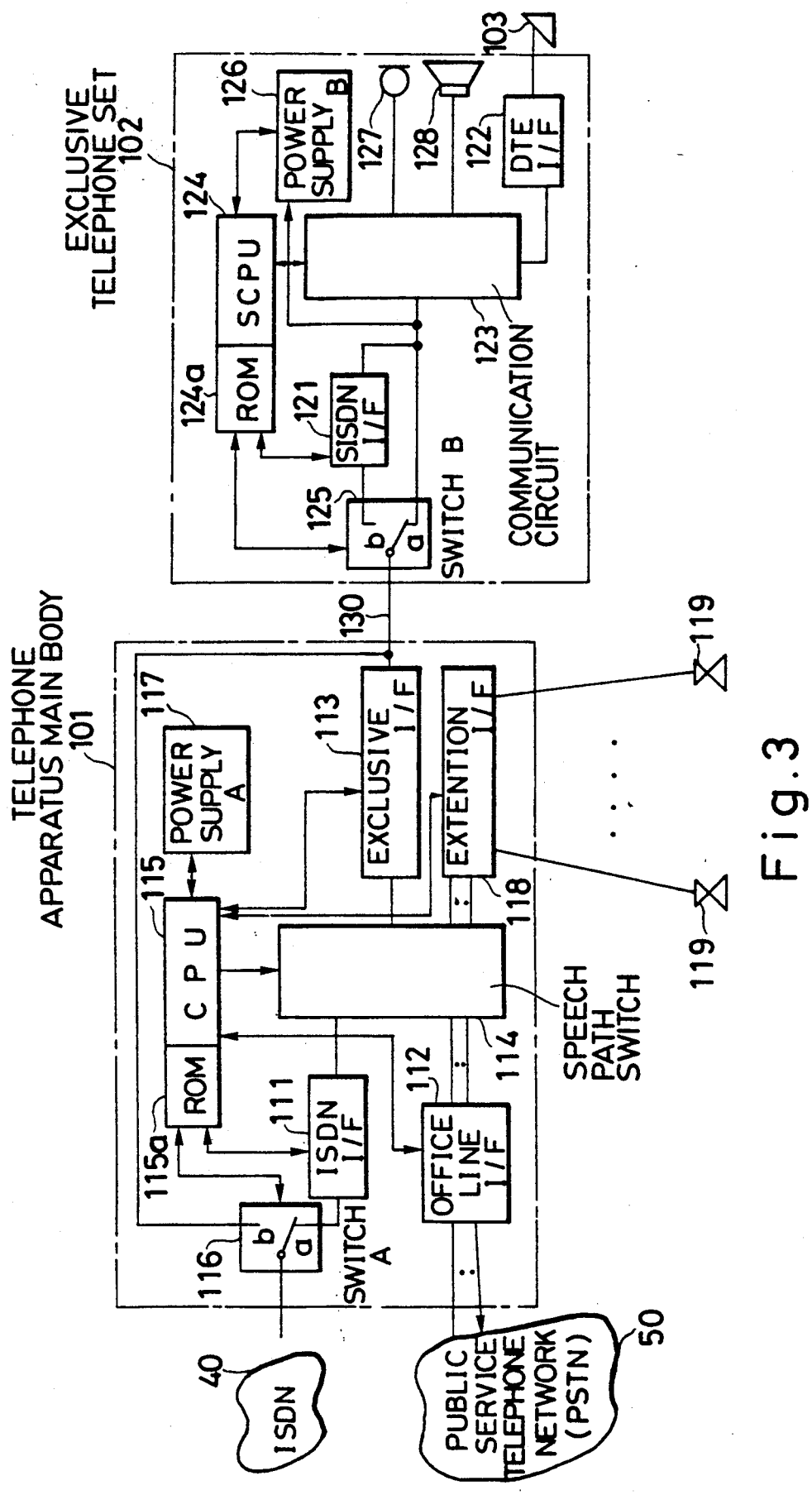
FIG. 3 is a block diagram showing an arrangement of a system according to a third embodiment of the present invention.

FIG. 3 is a block diagram showing an arrangement of a system according to the third embodiment of the present invention. In FIG. 3, reference numeral 101 denotes a main apparatus of a telephone apparatus which accommodates lines connected to an ISDN 40 and a PSTN 50; 102, an exclusive telephone set which is controlled by the main apparatus 101 and can be directly connected to the ISDN 40; 103, a data terminal connected to the exclusive telephone set 102; and 119, extension telephone sets connected to the main apparatus 101.

The main apparatus 101 has the following arrangement. That is, in the main apparatus 101, reference numeral 111 denotes an ISDN interface (ISDN I/F) for interfacing with the ISDN 40; 112, an office line interface (office line I/F) for interfacing with the PSTN; 113, an exclusive interface (extension I/F) for interfacing with the exclusive telephone set 102; 114, a speech path switch for performing speech path control between connected telephone sets and between the connected telephone sets and the accommodated lines, and sending various tones; 115, a CPU for detecting a power failure and controlling the entire main apparatus in accordance with a program stored in an internal ROM 115a; 116, a switch A for, when a power failure occurs, directly connecting the lines connected to the ISDN to the exclusive telephone set 102 while detouring the internal circuit of the main apparatus 101 under the control of the CPU 115; 117, a power supply A, obtaining an electric power from a commercial power supply line, for supplying a drive power to respective components and the exclusive telephone set 102 in the main apparatus 101. Reference numeral 118 denotes an extension interface (extension I/F) B for accommodating connection extensions and interfacing with the extension telephone sets 119 connected to the extensions.

The exclusive telephone set 102 has the following arrangement. More specifically, in the exclusive telephone set 102, reference numeral 121 denotes a slave ISDN interface (SISDN I/F) for interfacing with the ISDN 40; 122, a DTE interface (DTE I/F) for interfacing with the data terminal 103; 123, a communication circuit for performing analog-to-digital (A/D) conversion and digital-to-analog (D/A) conversion of a speech signal and assembling/disassembling the speech signal and a communication data signal from the data terminal 103; 124, a slave CPU (SCPU) for controlling the entire telephone set in accordance with a program stored in an internal ROM 124a; 125, a switch B for connecting a connection line 130 extending from the main apparatus 101 to the communication circuit 123 in a normal state and connecting the connection line 130 to the SISDN I/F 121 side in a power failure state of the main apparatus 101 under the control of the SCPU 124; and 126, a power supply B for receiving a phantom power supply from the ISDN 40 in a power failure state of the main apparatus 101 and supplying power to respective components of the exclusive telephone set 102. Reference numeral 127 denotes a microphone; and 128, a speaker.

The switch A 116 and the switch B 125 are connected to a contact "a" side in a normal operation state, as shown in FIG. 3.

For this reason, the ISDN 40 is connected to the ISDN I/F 111, and a speech-data integral signal from the ISDN 40 is sent to the exclusive telephone set 102 through the ISDN I/F 111, the speech path switch 114, the exclusive I/F 113, and the connection (transmission) line 130. In this case, the switch B 125 in the exclusive telephone set 102 is connected to the contact "a" side to directly connect the connection line 130 extending from the main apparatus 101 to the communication circuit 123.

The speech-data integral signal from the exclusive I/F 113 is disassembled into a speech signal and a data signal by the communication circuit 123. The speech signal is D/A-converted to an analog signal, and the analog signal is output from the speaker 128. On the other hand, the data signal is sent to the data terminal 103 through the DTE I/F 122 as a digital signal.

The communication circuit 123 A/D-converts an analog speech signal input from the microphone 127, and assembles the digital speech signal and a data signal input from the data terminal 103 through the DTE I/F 122 in the form of a speech-data integral signal, and sends it to the main apparatus 101.

Note that the communication circuit 123 performs A/D and D/A conversions of the speech signal, and assembles/disassembles the speech signal and a communication data signal from/to the data terminal 103. However, assembly/disassembly of the speech signal and the communication data signal from/to the data terminal 103 can be performed by the SCPU 124.

In the main apparatus 101, the input integral signal is received at the CPU 115 through the exclusive I/F 113, and is simultaneously sent to the ISDN I/F 111 through the speech path switch 114. The signal is sent onto the ISDN 40 via the switch A 116, and is then sent to a desired communication destination apparatus.

On the other hand, lines extending from the PSTN 50 are accommodated in the office line interface 112, and are then connected to the speech path switch 114. The extension telephone sets 119 are connected to the speech path switch 114 through extensions and the extension I/F 118. The extension telephone sets 119 can allow verbal communications with the PSTN 50 through the extension I/F 118, the speech path switch 114, and the office line I/F 112.

When the extension telephone set 119 issues a calling request by off-hook, the extension I/F 118 detects this request, and informs the CPU 115. The CPU 115 forms a speech path with a desired extension telephone set or performs call processing for the PSTN 50 in accordance with the following telephone number signal.

When an incoming call signal is input from the PSTN 50, the office line I/F 112 detects this signal, and informs the CPU 115. The CPU 115 causes the office line I/F 118 to call the connected extension telephone sets 119. When a response is made to this calling, the CPU 115 controls the speech path switch 14 to form a speech path between the responding telephone set and the PSTN 50, thus performing verbal communication processing.

Control when the commercial power supply supplying a power to the main apparatus 101 is rendered inoperative due to a power failure or the like in the normal processing state described above will be described below.

In a power failure state, an output voltage of the power supply A 117 is decreased. For this reason, when the CPU 115 detects a decrease in output voltage of the power supply A 117, it switches the switch A 116 to a contact "b" side, i.e., to a side of detouring the internal circuit of the main apparatus 101. In the exclusive telephone set 102, when a power supply from the main apparatus 101 is stopped, an output voltage of the power supply B 126 is decreased. For this reason, when the SCPU 124 detects a decrease in voltage of the power supply B 126, it switches the switch B 125 to a contact "b" side, i.e., to the side of the SISDN I/F 121.

Figure 4:
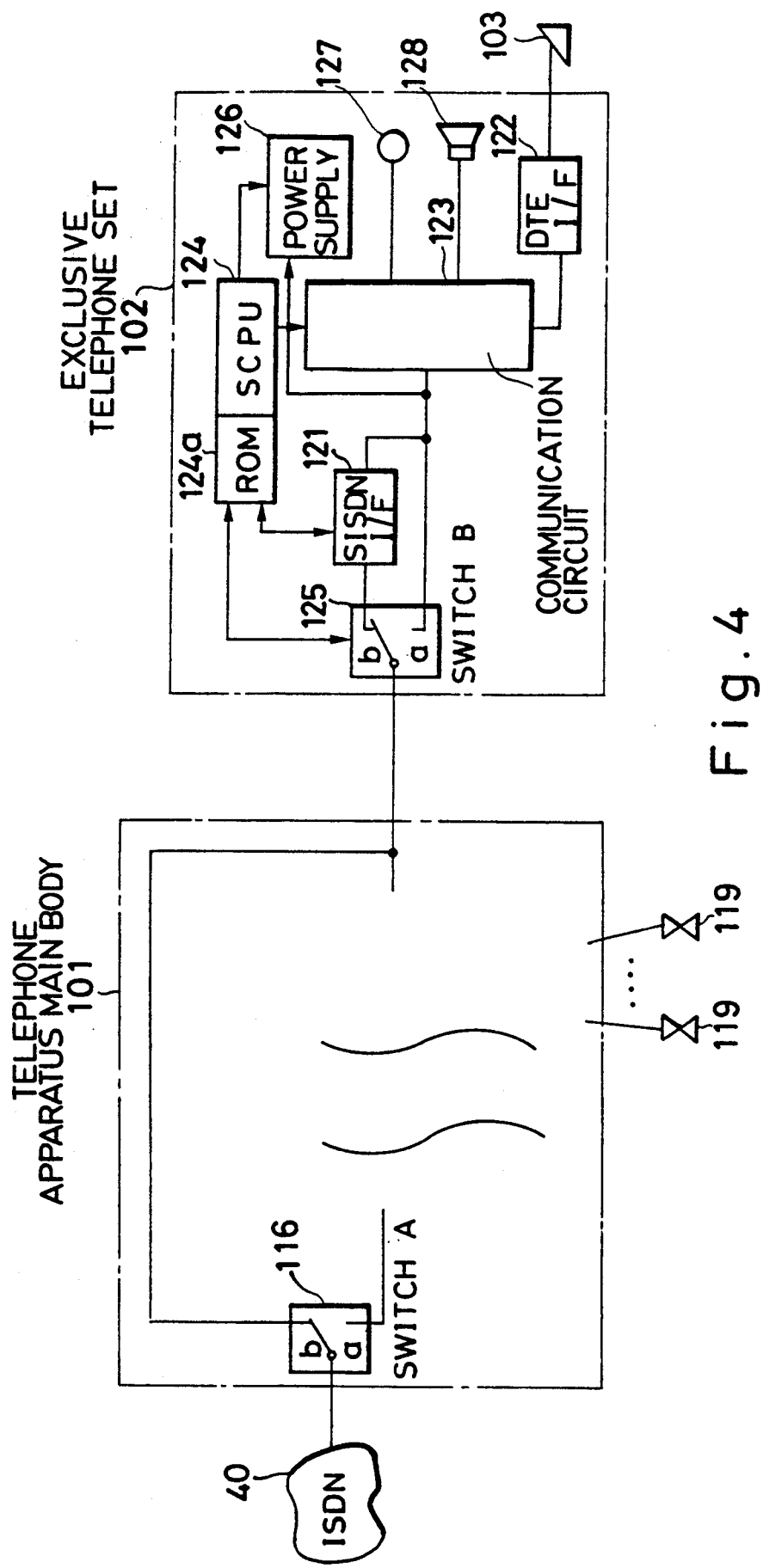
FIG. 4 is a block diagram showing a switching state of a switch upon a power failure according to the third embodiment of the present invention.
Figure 5:
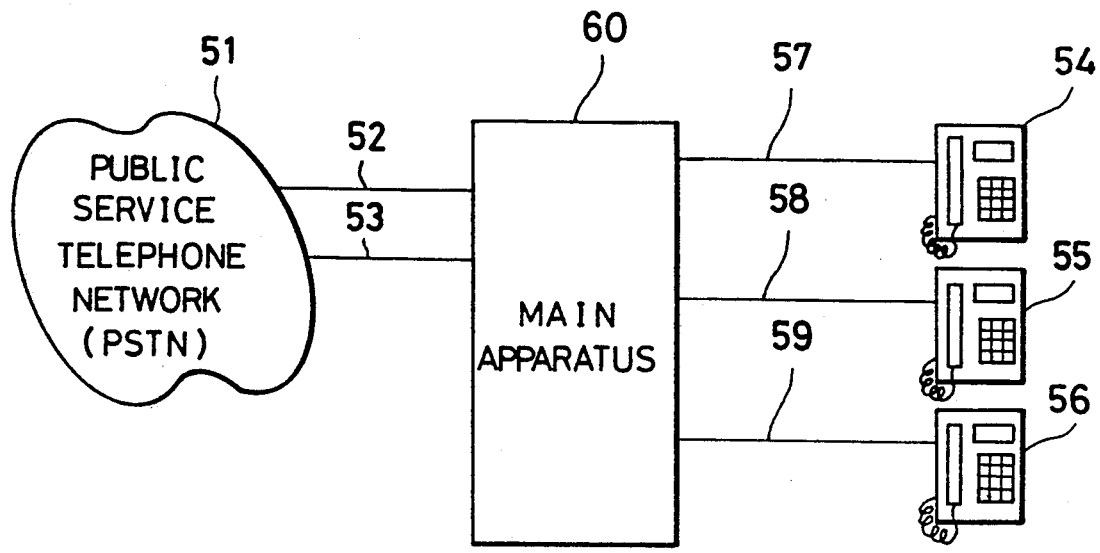
FIG. 5 is a block diagram showing an arrangement of a conventional telephone apparatus system connected to a public service telephone network.
Figure 6:
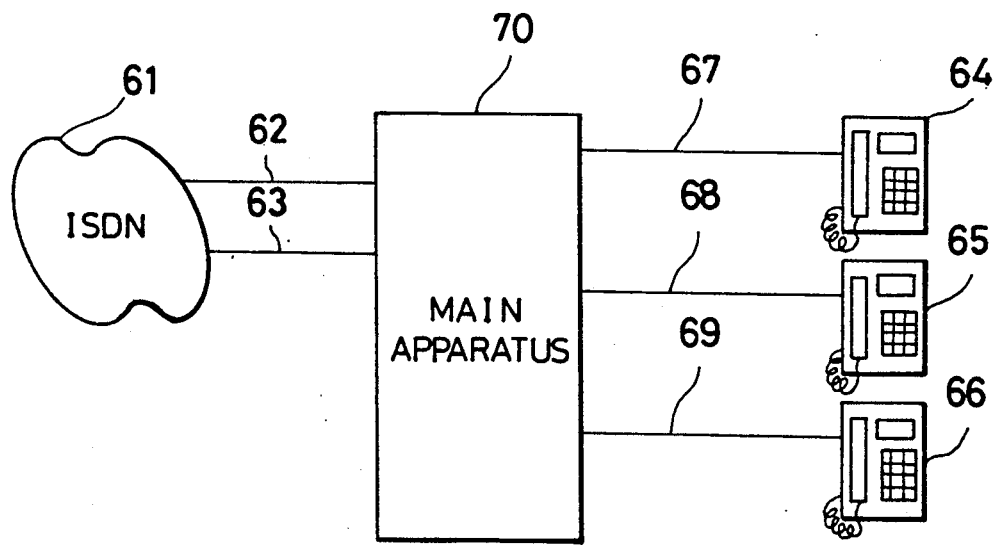
FIG. 6 is a block diagram showing an arrangement of a conventional telephone apparatus system connected to an ISDN.

FIG. 4 shows in detailed connection states of the switch A 116 and the switch B 125 and associated arrangements in the power failure state.

In FIG. 4, the components in the main apparatus 101 are deenergized, and a portion unnecessary in the operation described below is omitted.

As shown in FIG. 4, when the power supply A 117 of the main apparatus 101 is completely disabled, the switch A 116 is connected to the contact "b" side, and the exclusive telephone set 102 is directly connected to the ISDN 40. Furthermore, the switch B 125 of the exclusive telephone 102 is also connected to the contact "b" side, and the SISDN I/F 121 is directly connected to the ISDN 40 through the switch B 125. In this case, the power supply B 126 is set in an operative state by a power supply from the ISDN 40, and is maintained to be able to realize various services of the ISDN.

In the above description, switching control of the switch B 125 in the exclusive telephone 102 is performed by detecting a decrease in output voltage of the power supply B 126. However, the present invention is not limited to this. For example, a switching control signal from the main apparatus 101 may be received, so that switching control is performed based on the received signal.

The exclusive telephone set 102 described above is connected to the SISDN I/F 121 in the power failure state, and is operated as a telephone set exclusively used for the ISDN 40. However, in a normal state other than the power failure state, the exclusive telephone set 102 is connected to the exclusive I/F 113 of the main apparatus 101, and can make a verbal communication with an analog telephone set connected to the PSTN 50 through the PSTN 50. Furthermore, the telephone set 102 can make a verbal communication with the extension telephone sets 119. In this case, the exclusive I/F 113 can convert an analog signal into a digital signal, and the communication circuit 123 may switch conversion processing in accordance with whether an input signal is an analog or digital signal.

As described above, in the normal operation state, the telephone apparatus system of this embodiment serves as a telephone apparatus connected to the PSTN 50, and can also serve as an ISDN correspondence apparatus through the ISDN I/F 111 for the ISDN 40.

In a power failure state, the SISDN I/F 121 of the exclusive telephone set 102 is automatically directly connected to the ISDN 40, and the system can serve as an ISDN correspondence apparatus.

As described above, according to this embodiment, the system includes the exclusive telephone set 102 having the ISDN I/F which can be operated while being connected to the ISDN 40, and the main apparatus 101 comprises a means for automatically directly connecting the exclusive telephone set 102 to the ISDN in a power failure state. Thus, the following effects can be obtained.

(1) When the main apparatus 101 stops its operation in a power failure state, the various ISDN services can be obtained using the exclusive telephone set 102.

(2) In this case, no special operation, e.g., changing connections in the normal operation state and in the power failure state, is required.

(3) No switching operation is required.

As described above, according to the present invention, when the apparatus main body is rendered inoperative due to a power failure or the like, a connected telephone set can perform an operation as an ISDN correspondence device by a power supply from the ISDN.

In each of the above embodiments, when the telephone apparatus is rendered inoperative due to a power failure or the like, a connected extension telephone set or an exclusive telephone set is directly connected to the PSTN 50 or the ISDN 40 to be set in an operative state. The telephone apparatus may comprise a combination of the arrangement shown in FIG. 3 for directly connecting a telephone set to the ISDN 40 and the arrangement shown in FIG. 1 for directly connecting a telephone set to the PSTN 50. With this arrangement, when the telephone apparatus is rendered inoperative due to a power failure, connected telephone sets can be connected to the corresponding networks. Thus, an incoming call signal from either of the ISDN 40 and the PSTN 50 can be responded in a power failure state.

Furthermore, telephone sets connected to the ISDN 40 and telephone sets connected to the PSTN 50 in a power failure state may be combined.

As many apparently widely different embodiments of the present invention can be made without departing from the spirit and scope thereof, it is to be understood that the invention is not limited to the specific embodiments thereof except as defined in the appended claims.

What is claimed is:

1. A telephone apparatus system comprising:
   a telephone apparatus main body which comprises ISDN connection means for accommodating a line connected to an ISDN, telephone line connection means for accommodating a line connected to a public service telephone network, extension accommodation means for accommodating extensions connected to extension telephone sets, and verbal communication control means for performing speech path control among accommodated lines;
   a first extension telephone set which is connected to the connected extension and comprises ISDN verbal communication means capable of performing verbal communication control in an ISDN verbal communication mode and first switching means for directly connecting said ISDN to said ISDN verbal communication means when said telephone apparatus main body is in a disabled state; and
   a second extension telephone set which is connected to the connected extension and comprises PSTN verbal communication means capable of performing verbal communication control in a PSTN verbal communication mode of the public service telephone network,
   wherein said first extension set enables performing direct verbal communication with said ISDN by said ISDN verbal communication means.

2. The telephone apparatus system according to claim 1, wherein said verbal communication control means in said telephone apparatus main body comprises a second switching means for directly connecting said first extension telephone set to the ISDN when said telephone apparatus main body is in the disable state.

3. The telephone apparatus system according to claim 2, wherein said first extension telephone set receives an operation power supplied from said telephone apparatus main body in an operative state of said telephone apparatus main body, and receives an operation power from the ISDN and can perform verbal communication with the ISDN when said telephone apparatus main body is in the disable state.

4. A telephone set, connected to a telephone apparatus main body which accommodates lines connected to an ISDN and a public service telephone network, comprising:

a communication circuit for transmitting/receiving a digital verbal communication signal from said telephone apparatus main body to/from a connected digital terminal, and converting the digital verbal communication signal into an analog signal for a connected microphone and a connected speaker or converting the analog signal into a digital signal;

ISDN verbal communication means capable of performing verbal communication control with the ISDN;

switching means for selectively connecting said ISDN verbal communication means and said communication circuit; and a power supply section for receiving an operation power from a connection line with said telephone apparatus main body, wherein said switching means is connected to said communication circuit in an operative state of said telephone apparatus main body, and is connected to said ISDN verbal communication means in an inoperative state of said telephone apparatus main body to connect said communication circuit through said ISDN verbal communication means.

5. The telephone set according to claim 4, wherein said switching means switches the connection line from said communication circuit to said ISDN verbal communication means when a power supplied from said power supply section is decreased.

6. The telephone set according to claim 5, wherein said power supply section receives the operation power supplied from said telephone apparatus main body in an operative state of said telephone apparatus main body, and receives an operation power supplied from the ISDN through said ISDN verbal communication means in an inoperative state of said telephone apparatus main body.

* * * * *